United States Patent [19]

Sellem et al.

[11] Patent Number: 5,514,914
[45] Date of Patent: May 7, 1996

[54] ELECTRONIC ANTITHEFT DEVICE FOR A MOTOR VEHICLE

[76] Inventors: Albert Sellem, Les Hameaux du Puissanton, 11 Allée des Albizias, Vallauris; François Iosca, 30 Bd Riquier, Nice, both of France

[21] Appl. No.: 101,985

[22] Filed: Aug. 4, 1993

[30] Foreign Application Priority Data

Aug. 6, 1992 [FR] France ................... 92 09971

[51] Int. Cl.⁶ ................................................. B60R 25/10
[52] U.S. Cl. ........................................ 307/10.5; 307/10.2
[58] Field of Search ................... 307/10.5, 10.2; 361/171–172, 168.1, 169.1; 340/63, 825.31, 825.32, 64; 250/227, 555, 225; 70/278, 277, 284, 264, 237; 180/281, 287

[56] References Cited

U.S. PATENT DOCUMENTS 4,835,407  5/1989  Kataoka et al. .................. 307/10.5

FOREIGN PATENT DOCUMENTS 0139059  5/1985  European Pat. Off. .
0444412  9/1991  European Pat. Off. .
2494534  5/1982  France .
2569641  3/1986  France .
2575981  7/1986  France .

*Primary Examiner*—Peter S. Wong
*Assistant Examiner*—Aditya Krishnan
*Attorney, Agent, or Firm*—Young & Thompson

[57] ABSTRACT

An electronic antitheft device for a motor vehicle provided with conventional functional elements allowing the control of the operation of the vehicle, namely for example an electric battery for the general electric power supply of the vehicle, an electric starter and brakes, has a remote control box for transmitting a digital code carried for example by an infrared beam, the remote control box cooperating with a receptacle disposed in the driving compartment of the vehicle so that the digital code is only transmitted if the remote control box is disposed in the receptacle, and an electronic center having a digital code receiver, and switches connected to one or more of the functional elements so as to control their operation in the case of the reception of said digital code.

17 Claims, 8 Drawing Sheets

FIG. I

ELECTRONIC ANTITHEFT DEVICE FOR A MOTOR VEHICLE

BACKGROUND OF THE INVENTION

1. Field of the Invention

The present invention relates to an electronic antitheft device for a motor vehicle having conventional functional elements allowing the control of the operation of the vehicle, namely for example an electric battery for the general electric power supply of the vehicle, an electric starter and brakes.

2. Details of the Related Art

In view of the increase in the number of thefts of motor vehicles in the last few years many antitheft devices have been developed and put on the market.

Thus, antitheft devices are known in the art which act mechanically on a control element of the vehicle, for example its steering wheel or its clutch pedal.

There are also known from document FR-A-2 569 641 safety devices preventing the unauthorized use of a vehicle which are in the form of a key cooperating on one hand with a door lock, and, on the other hand, with a key hole located on the dashboard of the vehicle. The key combines the conventional door lock opening or closing functions or the actuation of a starter, with an electronic function for opening or closing an electric switch controlling an operational system of the ignition type.

Notwithstanding the fact that the last-mentioned device is a distinct improvement over solely mechanical antitheft devices, a number of drawbacks remain, in particular the fact that this antitheft device cannot be actuated by a remote control, and that the coding does not make a distinction between the opening of the doors and the actuation of the functional elements of the vehicle and concerns a small number of bits which may be detected by scanning. Moreover, this antitheft device has no means for signalling a vehicle which might have been stolen notwithstanding the presence of the antitheft device.

Owing to the insufficiencies of the known antitheft devices, the number of vehicles stolen per year is more than 300,000 in France alone, with similar figures in other countries.

In view of this state of the art, an object of the invention is to provide an antitheft device for a motor vehicle which remedies all the drawbacks of known devices.

In particular, an object of the invention is to provide an electronic antitheft device which acts in a distinct manner on a plurality of components essential to the operation of the vehicle, while being easy to use and permitting its activation and deactivation by a mere pressing of keys of a remote control box.

A further object of the invention is to provide an antitheft device which achieves an antitheft effectiveness never achieved up to the present time while permitting an easy location of a vehicle so equipped if the latter is nonetheless stolen.

The invention therefore provides an electronic antitheft device for a motor vehicle provided with conventional functional elements allowing the control of the operation of the vehicle, namely for example an electric battery for the general electric power supply of the vehicle, an electric starter and brakes, characterized in that it comprises:

a remote control box for transmitting a digital code carried in particular by an infrared beam, said remote control box cooperating with a receptacle disposed in the driving compartment of the vehicle so that said digital code is only transmitted if the remote control box is disposed in the receptacle;

an electronic centre comprising on the input side means for receiving said digital code, and connected on the output side to one or more of said functional elements so as to control their operation in the case of the reception of said digital code.

According to other features of the invention:

said receptacle comprises means for closing an electric switch of the remote control box upon the positioning of said remote control box in said receptacle, said electric switch being disposed in the electric circuits of the remote control box so as to prevent the transmission of said digital code so long as said electric switch is open;

said means for closing an electric switch are constituted by a magnetic device, for example a permanent magnet disposed in proximity to the receptacle, for example under the base of the latter, and said electric switch is an electromagnetic switch which is closed under the effect of said magnetic device when the remote control box is positioned in the receptacle;

said remote control box comprises infrared means for transmitting said digital code by actuation of a group of contact keys disposed on said box, one of said contact keys causing the actuation of a first functional element of the vehicle, for example the locking/unlocking of the doors of the vehicle by transmission and decoding of said digital code, and the actuation of at least one of the other keys causing the actuation of a plurality of other functional elements of the vehicle as soon as said mobile remote control box is disposed in said receptacle;

the remote control box is positioned in the receptacle in such manner that said infrared transmitting means are in direct view of said receiving means;

the antitheft device comprises means for reflecting the infrared beam transmitted by the remote control box, said reflecting means ensuring the reflection of the infrared beam in a multitude of paths, and said receiving means being disposed at the intersection of any one of said paths for indirectly receiving the transmitted beam;

said reflecting means are constituted by a cylindrical reflecting billet disposed on the receptacle in direct view of the infrared beam transmitted by the remote control box;

a digital code is transmitted upon the actuation of any contact key of said box, said code comprising a first group of secret identification bits personalized for a given electronic antitheft device, and a second group of actuating bits representing the particular contact key actuated and corresponding to one or more particular functional elements of the vehicle;

said electronic centre comprises means for fixing a predetermined sequence of actuation of the functional elements of the vehicle, and means for comparing the order of actuation of the contact keys of the box with said predetermined sequence, said functional elements being actuated by the centre solely if the order of actuation of the keys corresponds to the predetermined sequence;

the other keys cause the actuation of electronic circuits controlling the release of the brakes of the vehicle, circuits controlling the closure of the general electrical circuit of the vehicle, circuits controlling the starter of the vehicle, or circuits controlling the opening of a fuel electrovalve;

said electronic centre comprises:
- a circuit for receiving and preamplifying the infrared beam, which drives circuits for decoding the access code transmitted by the remote control box;
- a circuit for storing a personalized identification code assigned to the considered antitheft device;
- comparison means connected to said decoding circuit and to said storage circuit for comparing said personalized code with that recorded in said storage circuit and only allowing the sequence of subsequent control operations of the electronic antitheft device in the case of coincidence of said comparison;
- flip-flop circuits generating actuating control signals when said comparison is positive, said actuating control signals being transmitted to the corresponding functional elements of the vehicle through the medium of electric relays disposed in the power supply circuits of said functional elements;
- said circuits for storing the access code comprise first logic circuits having shift registers disposed in a ring arrangement, and said decoding circuits comprise second logic circuits having shift registers for decoding actuating bits of the functional elements, the decoding of identification bits only being authorized if the correct access code has been decoded;

the electronic antitheft device further comprises:
- a radio beacon placed in said vehicle and provided with means for causing the transmission of the beacon in the case of a forced intrusion into the vehicle, for example by a forced opening of the doors, of the luggage compartment or of the engine hood of the vehicle or by the raising of the vehicle;
- means placed in said remote control box for neutralizing the operation of said radio beacon when transmitting a control signal for opening the doors, for example by the use of a mercury switch;
- said beacon further comprises radio receiving circuits, the signal transmitted or received employing a carrier wave whose frequency is within a frequency range used by road control organizations so as to facilitate the location by the latter of a stolen vehicle.

BRIEF DESCRIPTION OF THE DRAWINGS

Further features and advantages of the invention will be apparent from the following description given by way of example which is in no way limitative, with reference to the accompanying drawings in which.

BRIEF DESCRIPTION OF THE PREFERRED EMBODIMENT

Figure 1:
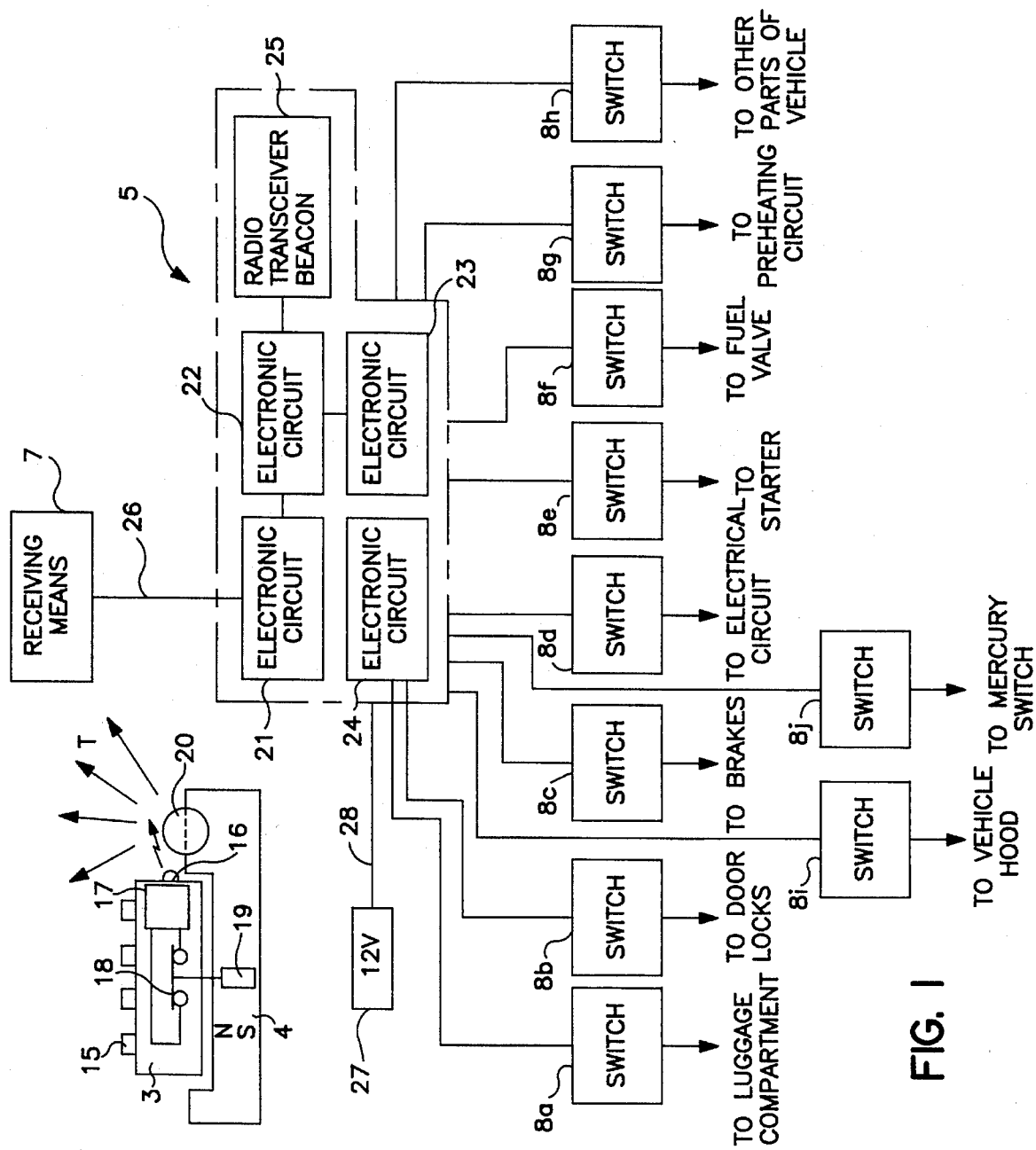
FIG. 1 is a block diagram illustrating the main components of the antitheft device according to the invention.

With reference to FIG. 1, the latter represents the general architecture of the electronic antitheft device 1 according to the invention. This device 1 comprises mainly a mobile remote control box 3, a receptacle or support 4 for the box 3, an electronic centre 5 connected on the input side to receiving means 7, and connected on the output side to a group of functional elements (not shown) of the vehicle, through the medium of a series of cut-off switches 8a, 8b, 8c, 8d, 8e, 8f, 8g, 8h, 8i, 8j.

Figure 2:
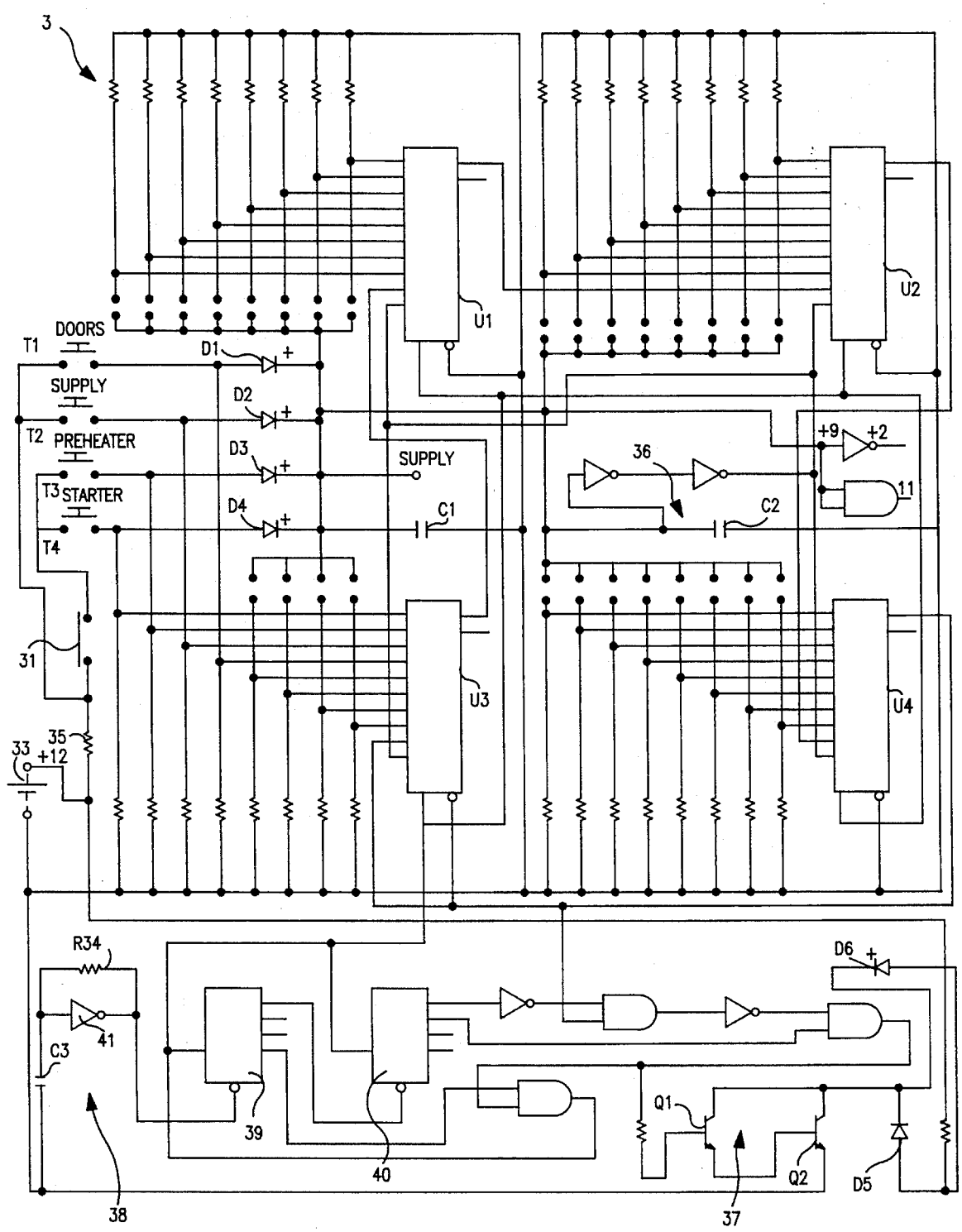
FIG. 2 is a more detailed view of the remote control box employing an infrared beam of the device shown in FIG. 1.

The remote control box 3 mainly comprises keys 15, transmitting means 16 employing in particular an infrared beam or any other suitable radiation and an internal circuit 17 for elaborating and transmitting coded digital or numerical messages, such as will be described hereinafter (FIG. 2).

The internal circuits 17 of the remote control box comprise an electric switch 18, preferably a normally open electromagnetic switch, which closes only under the action of a magnetic device, for example a permanent magnet 19 disposed in proximity to the receptacle 4. According to one embodiment of the invention, the receptacle has the shape of a box in which or under which the magnet is disposed, the assembly being fixed in any suitable place in the driving compartment. In particular, the receptacle 4 provided with its box 3 may be so arranged that the infrared transmitting means 16 of the box 3 is in direct view of the receiving means 7.

Alternatively, the electronic antitheft device 1 comprises means for reflecting the infrared beam transmitted by the remote control box 3. In particular, these reflecting means are constituted by a reflecting cylindrical billet 20 disposed on the receptacle, and ensuring the reflection of the infrared beam in a multitude of paths T. The receiving means 7 are then disposed at the intersection of any one of these paths so as to receive the beam transmitted in an indirect manner.

The center 5 is placed in any region of the vehicle (not shown) and comprises a plurality of electric or electronic circuits 7, 21, 22, 23, 24, 25.

Figure 3A:
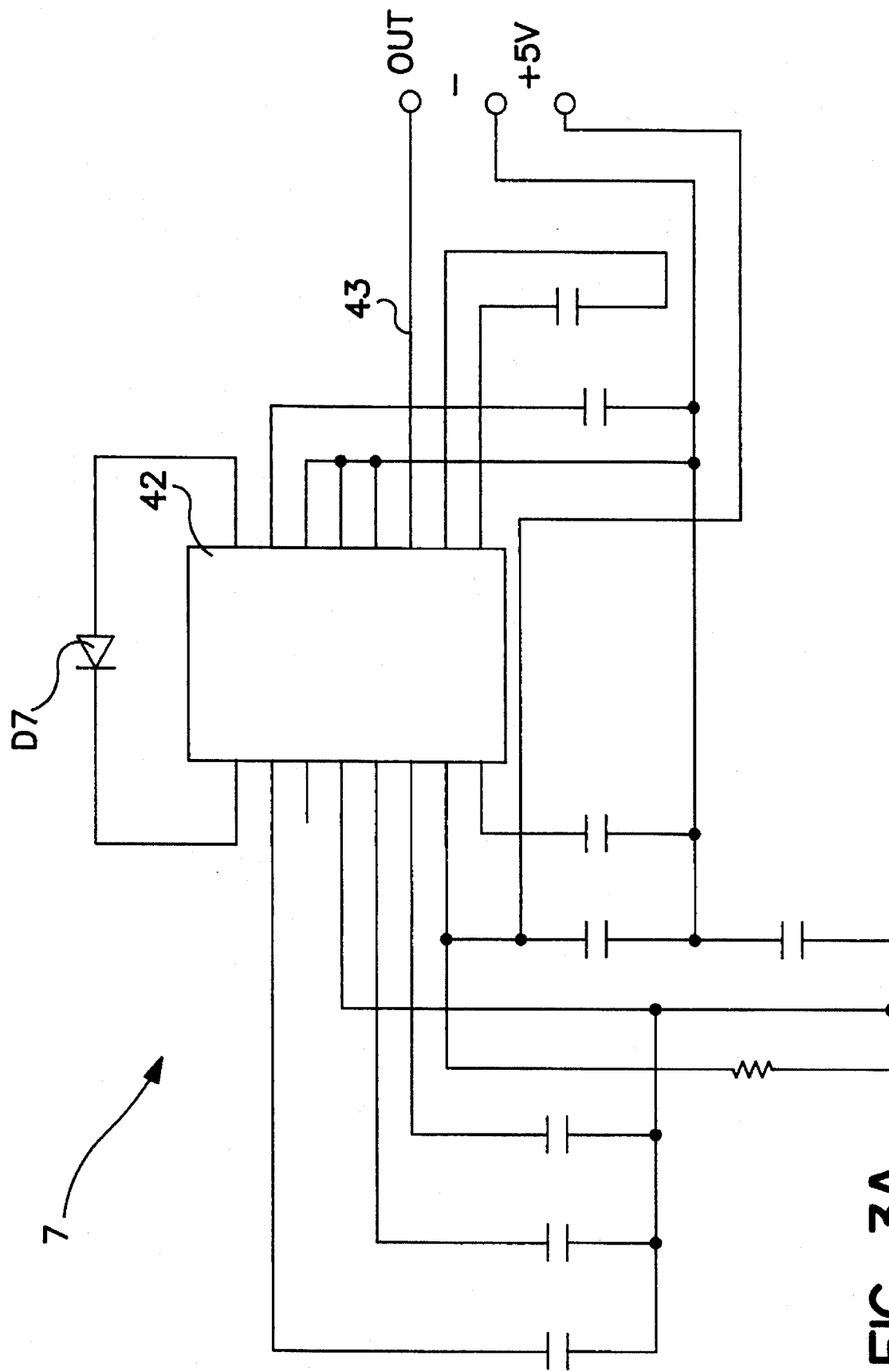
FIG. 3A is an electric diagram of the preamplifier of the infrared light employed in the fixed part or center of the antitheft device.

In particular, the fixed electronic centre 5 comprises a receiver 7 of the infrared ray transmitted by the remote control box 3 for converting the infrared light signal into an electric signal. This receiver 7, which will be described in detail with reference to FIG. 3A, is provided with a natural light amplifying and filtering function and is connected through an electric cable 26 to the rest of the center 5 for decoding the coded digital messages and generating control signals for the functional elements of the vehicle. The fixed center 5 further comprises a general power supply source 27 of the centre, a radio transmitting/receiving beacon 25. For vehicles provided with a contact key and a steering lock device of the "Neyman" type, the contact key is disposed on the power supply conductor 28 of the centre 5. The cut-off circuits 8a to 8j receive the aforementioned control signals and permit controlling a plurality of functional elements of the vehicle by depriving them of the general power supply of the vehicle or by earthing. The cut-off circuits associated with the functional elements of the vehicle may be preferably disposed on the same electronic card as the rest of the components of the fixed centre 5 or, on the contrary, disposed respectively in the region of the functional elements of the vehicle they must control.

In the embodiment of the invention given as a non-limitative example, the functional elements concerned may consist of the opening/closing switches of the doors of the vehicle, of the lid of the luggage compartment, or of the engine hood, the electric control circuits of the brakes, of the starter, of the fuel injection electric valve, or of the gasoil preheating circuit (in the case of diesel vehicles), or the general power supply itself, or any other useful functional element of the vehicle which may be controlled electrically.

All of the electronic circuits of the mobile remote control box 3 and of the fixed centre 5 will now be described with reference to the more detailed FIGS. 2, 3A to 3E and 4.

With reference to FIG. 2, the latter shows as an example a diagram of the realization of the infrared remote control box 3, with discrete components and a few integrated circuits.

The remote control box 3 is in the form of a small box, for example of plastics material (FIG. 1), carrying on one of its sides a plurality of contact keys 4, for example 4 keys (T1, T2, T3, T4) associated with the actuation of functional elements of the vehicle. Thus, the key T1 is connected to circuits controlling the locking/unlocking of the doors and of the lids or hood of the vehicle, the key T2 controls the connection of the general electric power supply of the vehicle and a fuel injection electric valve or a similar electric switch, the key T3 controls the connection of the gasoil preheating circuits (in the case of a diesel vehicle) or the supply of current to the ignition coil, and the key T4 controls the supply of current to the starter of the vehicle and/or the cutting off of its earth. Note that several of the aforementioned keys have a terminal connected to an additional switch 31, in particular a magnetic switch cooperating with the magnet 19 associated with the receptacle 4 as previously described, so that this switch 31 closes when the remote control box 3 is disposed in the driving compartment of the vehicle in proximity to the receptacle 4 or any other support carrying the magnet 19.

In the illustrated case, the contact keys T3 and T4 are in series with the magnetic switch 31. Consequently, although the doors of the vehicle may be opened and its general power supply connected up by actuation of the keys T1 and T2 respectively, the actuation of the starter of the vehicle, or generally of the functional elements connected in series with the switch 31, can occur if and only if the suitable remote control box 3 has previously been positioned by the owner of the vehicle in proximity to the centre 5 of the electronic antitheft device.

When the switch 31 is closed, one of the terminals of each control key is connected to the positive terminal of a power supply battery 33 of the remote control box 3 through a resistor 35.

The other terminal of the keys T1 to T4 is each connected to the anode of a diode D1 to D4. A cathode of each diode is connected to a group of shorting bars C0 to C23. These bars are individually opened or closed by shorting circuits depending on whether it is desired to generate a "1" or "0" for the corresponding bit of the digital code to be transmitted by the remote control box 3. These bars are connected to the data inputs of integrated circuits U1, U2, U3, U4 (for example circuits 74HC165) composed of shift registers, through polarization resistors R0 to R32.

The shift registers U1, U2, U3, U4 each permit serializing 8 code bits provided in parallel on their data inputs. These shift registers are then connected in cascade so as to obtain a code train of 32 bits. These 32 bits will constitute the frame or raster of the data transmitted by the infrared diodes of the remote control box. For this purpose, infrared diodes D5, D6 are used arranged for example at an angle of 90° so as to increase the solid angle within which the coded infrared transmission is effective.

The frame or raster of 32 bits is divided into four synchronization bits, 24 bits of a secret identification code corresponding to the code stored in the fixed centre 5 of the antitheft device, and 4 bits actuating functional elements actuated in accordance with the pressed key T1 to T4. The four integrated circuits U1 to U4 are connected in the form of a ring so as to transmit the frames of 32 bits continuously throughout the period during which a key T1 to T4 is actuated. Note that the use of a single personalized code of 24 bits plus 4 bits actuating functional elements allows about 128 million different codes which renders the detection of the particular code employed difficult.

The loading of the 32 bits in the integrated circuits is effected preferably after a certain delay, created by means of a Schmitt trigger (R33 and C2) permitting the stabilization of the power supply of the integrated circuits before the recording of the 32 bits to be transmitted.

The remote control box 3 further comprises a group 37 of a plurality of discrete components connected in the known manner for generating at the terminals of the infrared diodes D5, D6 an infrared signal correctly shaped and representing the aforementioned coded frame of 32 bits. In particular, at the output of the shift registers U11 to U4, the frame of 32 bits before shaping drives a Schmitt trigger 38 (R34, C3), followed by dividers by 16 (39, 40) connected in series for the division by 256 of a clock signal provided by the circuit 41. Upon the resetting of the dividers, the frame of 32 bits is shifted by one bit so that the next bit of the coded sequence is transmitted to the transistors Q1, Q2 and to the diodes D5, D6 for transmission.

The elements of the fixed centre 5 of the electronic antitheft device according to the invention will now be described. These elements are distributed among the FIGS. 3A, 3B, 3C, 3D and 3E which are interconnected.

FIG. 3A shows the electric diagram of the infrared receiver 7. This receiver comprises in the conventional manner an infrared receiving diode D7, of the type BP104, connected to an infrared light preamplifier 42 constituted by an integrated circuit of the type SL486 amplifying the useful signals and eliminating by filtering the harmful spurious signals. For this purpose, the circuit 42 is provided on its inputs with a group of components including resistors and capacitors the values of which are calculated by one skilled in the art for obtaining a filtering of the input signal within the desired range by allowing to pass only the useful range of the square signal carrying the coded sequence of bits. The circuit 42 delivers at its output OUT 43 an electric signal which is filtered and shaped and represents the received infrared series signal. This signal is transmitted through the cable 26 (FIG. 1) to the electronic stages 21, 22 for the storage and the decoding of the code of the centre 5 of the antitheft device.

Figure 3B:
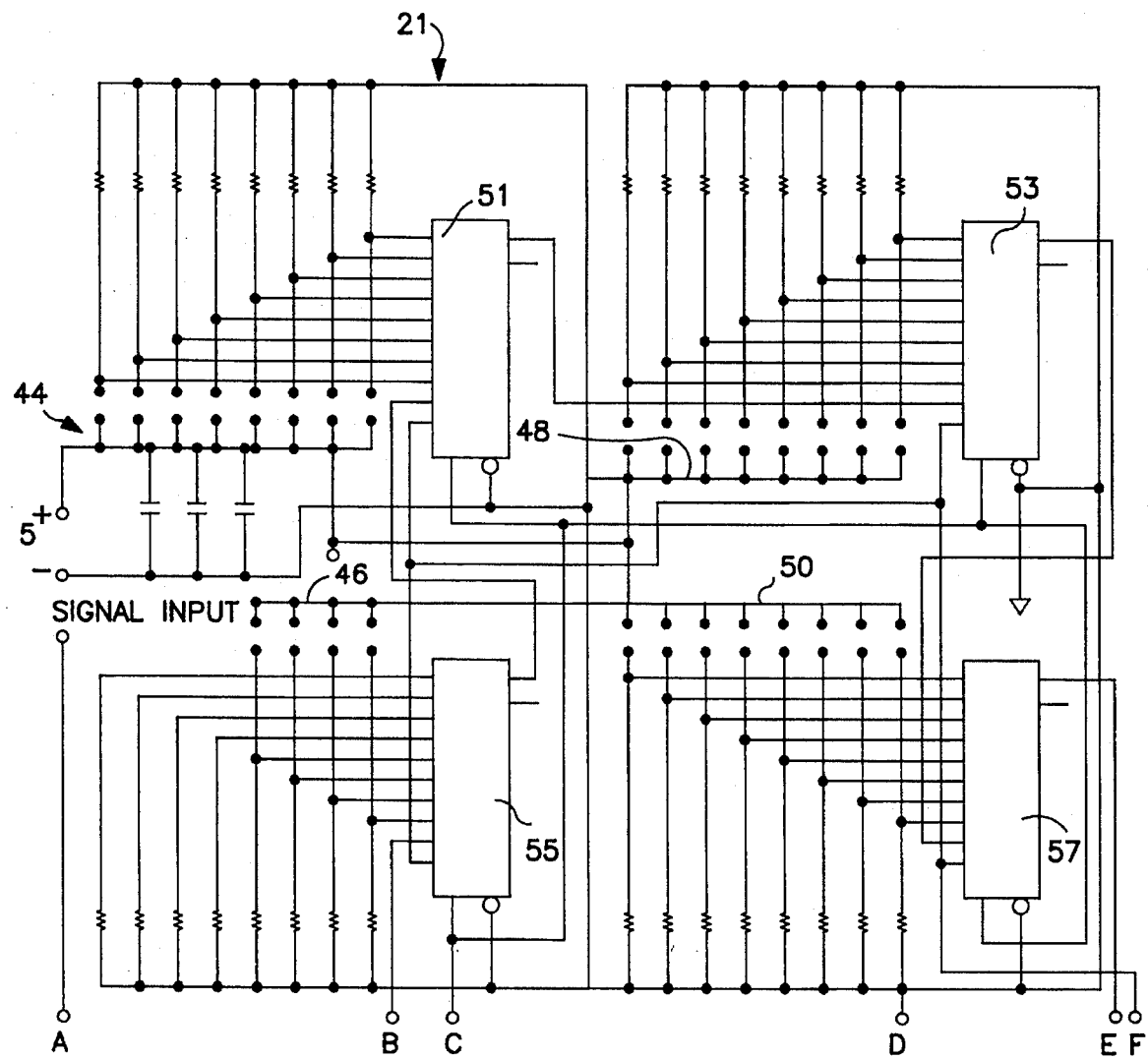
FIG. 3B is an electric diagram of a second part of the coded receiver of the antitheft device shown in FIG. 1.
Figure 3C:
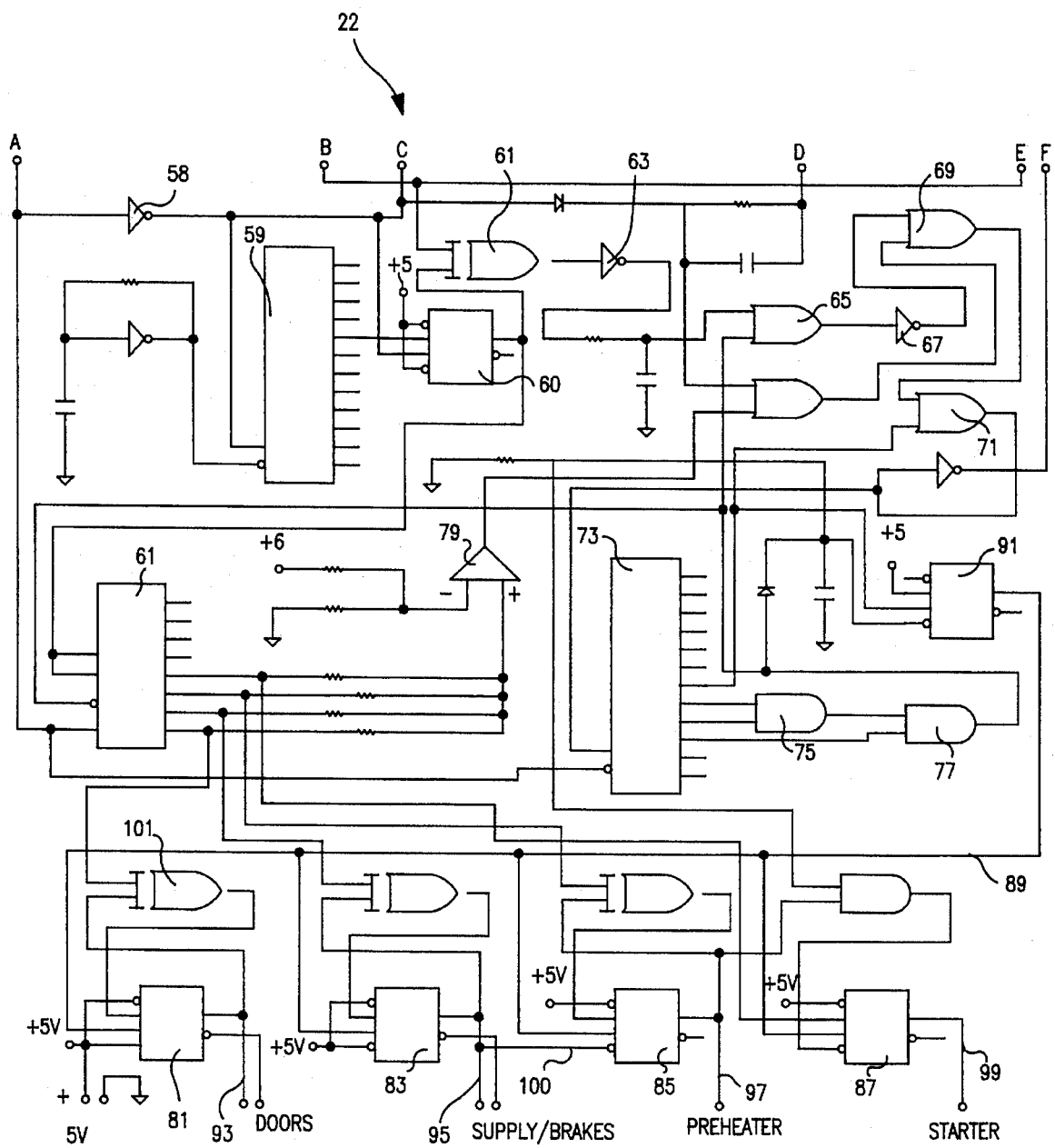
FIG. 3C is an electric diagram of a third part of the coded receiver of the antitheft device shown in FIG. 1.

These stages 21, 22 are shown in FIGS. 3B and 3C. The part shown in FIG. 3B represents the circuits for deserializing and storing the code of 32 bits introduced upon the personalization of each fixed centre with a unique code assigned to the considered antitheft device. This code is set in the factory where the bits of the code are provided in parallel at the shorting bars 44, 46, 48, 50. The bits of the code are then serialized by four shift registers 51, 53, 55, 57 each having 8 bits (of the type 74HC165). These shift registers are again provided with external components for polarizing and filtering their supply in the form of resistors and capacitors of appropriate values in the known manner.

Note that the connections with the circuits shown in FIG. 3C are made at points A, B, C, D, E and F corresponding to the following signals:

A: series input signal coming from the infrared receiver 7.

B: series input of the last shift register which, connected to the output of the first register, provides a continuous circulation of the frame of 32 bits of the code between the shift registers for the purpose of comparison with the incoming code from the infrared receiver.

C: clock input of the four shift registers 51, 53, 55, 57.

D: connection to earth.

E: output of the series reference code having 32 bits.

F: control of the shifting/loading of the data ("0" for loading, "1" for shifting).

With reference now to FIG. 3C corresponding to the circuit 22 shown in FIG. 1, the represented circuits principally serve to effect the comparison of the reference code or identification code of the fixed centre 5 and the code transmitted by the remote control box 3, and to generate the control signals for actuating or inhibiting functional groups of the vehicle in accordance with the result of this comparison.

In more detail, the signal from the infrared receiver available at A is transmitted after inversion at 58 to a counter 59 to a flip-flop 60. The output of the flip-flop 60 is delivered to a shift register 61 connected as a series-parallel converter which permits isolating at its output the 4 bits corresponding to the 4 keys T1 to T4 of the remote control box. The output of the flip-flop 60 also drives an OR gate 61 which receives on its other input the successive bits of the reference code for the purpose of comparing bit by bit the reference code and the code received from the remote control box. Each correspondence of 2 bits is transmitted to a group of logic gates 63, 65, 67, 69, 71 and produces in the end the incrementing of a counter 73 upon each coincidence between two consecutive code bits. The counting is effected on 32 bits, namely 28 first bits corresponding to the secret identification code and 4 actuating bits each corresponding to the control bit issuing from one of the keys T1 to T4 of the remote control box 3.

AND gates 75, 77 cause the resetting of the counting after a sequence of 32 bits, or upon each discordance between 2 bits of the reference code and of the access code transmitted by the remote control box (or possibly a spurious source).

Further, the outputs Qa, Qb, Qc, Qd of the shift register 61 are delivered to a comparator 79 which causes the resetting of the counting and bit by bit comparisons in the case where two of said outputs Qa to Qd would be simultaneously in state "1" signalling the simultaneous pressing of two keys among the keys T1 to T4 of the remote control box.

Note that alternative embodiments may easily provide means for resetting the counting if the keys T1 to T4 are not actuated and decoded according to a predetermined sequence chosen by the manufacturer, or with a certain time delay between the keys or on a given key.

The data of Qa, Qb, Qc, and Qd are then transmitted to the input of a group of flip-flops 81, 83, 85, 87 also receiving a validation signal at 89 issuing from a flip-flop 91 receiving at its input the output of the counter 73. Thus, the validation signal is sent to the flip-flops 81 to 87 solely if the counting has reached the value 32 which signifies that all the 28 bits of the identification code have been validly received by the fixed centre 5 of the antitheft device and that the control signal on 4 bits for the principal functional elements of the vehicle has also been validly transmitted.

The output of the flip-flop 83 is connected through a connection 100 to the resetting input of the flip-flop 85. Thus, the function controlled by the flip-flop 85 can only be actuated if the function controlled by the flip-flop 83 is already activated, which permits introducing an order or a predetermined sequence according to which the keys 4 must be actuated.

A NAND gate 101 may be disposed between the input and the output of each flip-flop 81 to 87 so as to be able to control the functional elements of the vehicle either by high levels or low levels as a function of the requirements of the manufacturer of the vehicle.

The outputs 93, 95, 97 and 99 of the respective flip-flops 81, 83, 85 and 87 are then connected in series in the electric supply circuits of all the functional elements of the vehicle the function of which is desired to be controlled.

Figure 3D:
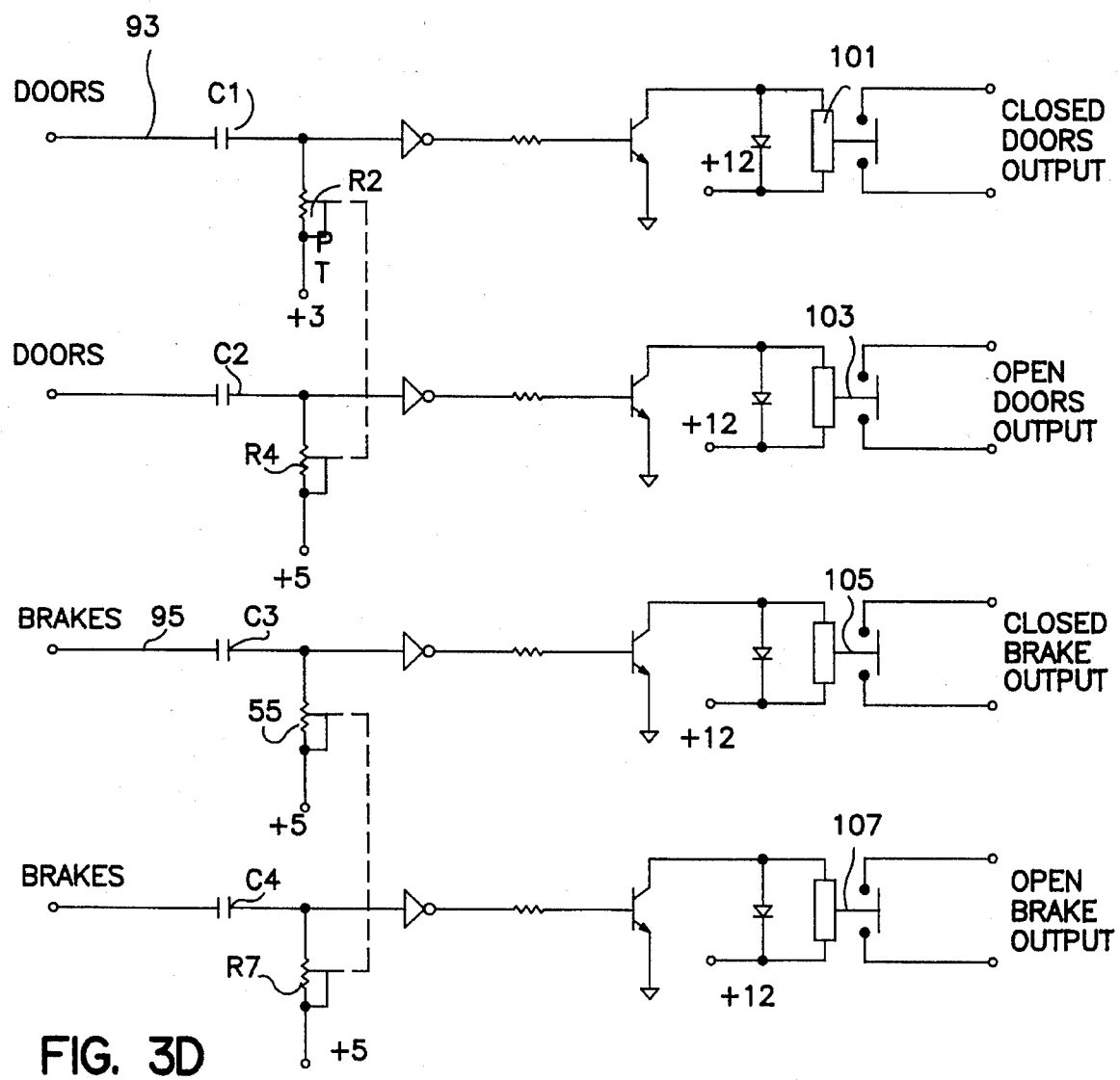
FIG. 3D is an electric diagram of a fourth part of the coded receiver of the antitheft device shown in FIG. 1.
Figure 3E:
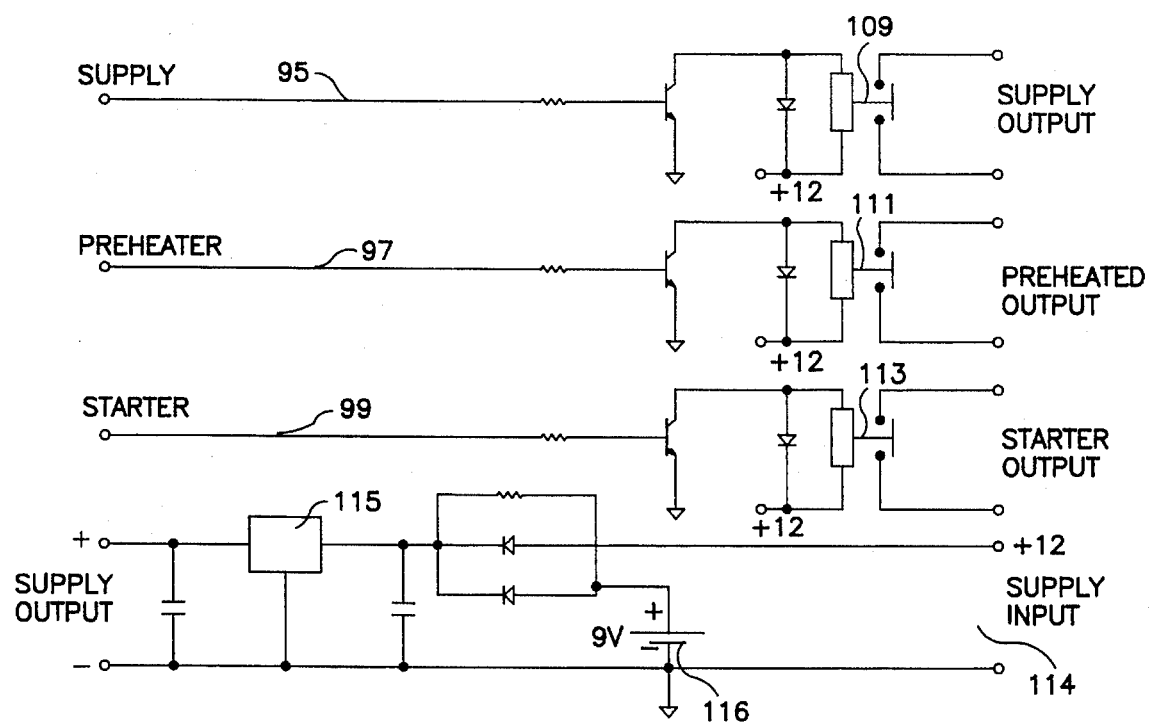
FIG. 3E is an electric diagram of a fifth part of the coded receiver of the antitheft device shown in FIG. 1.

With reference now to FIGS. 3D and 3E, showing the use of output signals of the flip-flops 81, 83, 85, 87 shown in FIG. 3C, in the illustrated embodiment, the output 93 of the flip-flop 81 is placed in the supply circuit of the relays 101, 103 for opening/closing the doors of the vehicle, so that the doors are opened when the pressing of the key T1 of the remote control box 3 is decoded by the fixed centre 5 of the device. Likewise, the output 95 of the flip-flop 83 is connected in series with the supply circuit of the brakes and drives the relays 105, 107 so that the brakes remain applied so long as the key T2 of the box 3 has not been pressed and decoded. Lastly, as shown in FIG. 3E, the outputs 95, 97, 99 of the flip-flops 83, 85 and 87 are connected in the general supply circuit, the supply circuit for the preheating of the fuel and the supply circuit of the starter, or any other functional element of the vehicle which may be employed for preventing the unauthorized use of the latter.

The control signals issuing from the flip-flops 83, 85, 87 drive the relays 109, 111, 113 which permit controlling several tens of amperes. In FIG. 3D, the controls for opening or closing the doors or actuating the brakes are pulse controls having a duration of operation of the components C1, C2, R2, R4 (for the doors) and C3, C4, R5 and R7 (for the brakes).

In FIG. 3E, the controls actuating the general power supply and the preheating are monostable and that of the starter causes the actuation of the latter so long as the corresponding key (T4) of the remote control box remains pressed.

Also shown in FIG. 3E is a 12 volt electric power supply 114 of regulated in voltage by a regulator 115, and an emergency battery 116 of 9 volts which takes over from the supply 112 if need be.

Figure 4:
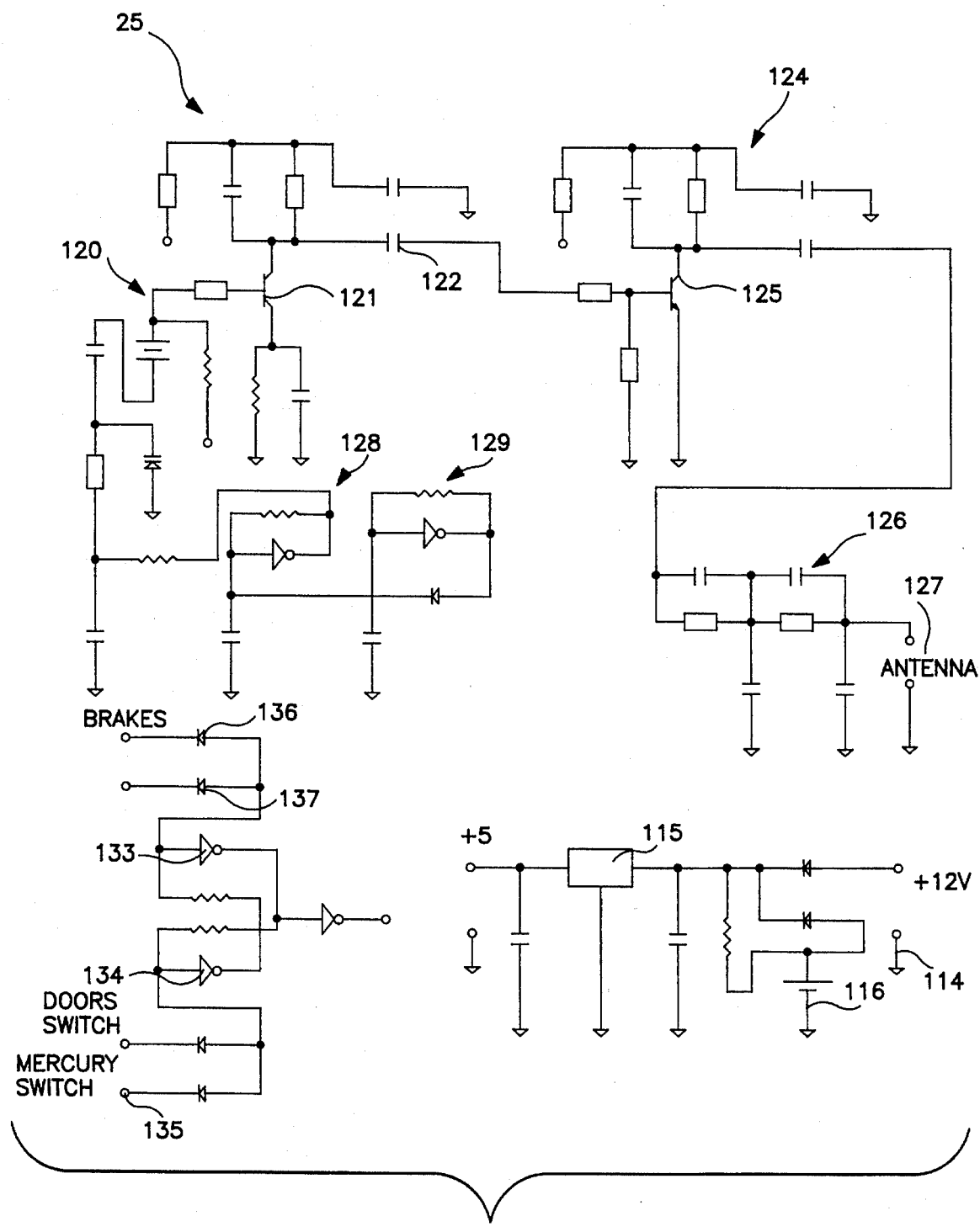
FIG. 4 is an electric diagram of a theft-signalling beacon of the antitheft device shown in FIG. 1.

FIG. 4 shows an embodiment of a radio beacon 25 (FIG. 1) with which the centre 5 of the electronic antitheft device according to the invention is provided.

This beacon 25 comprises an oscillator of known type and carrying the general reference character 120. The output signal is taken from the collector of the transistor 121 then sent through the capacitor 122 to the selective amplifier 124 operating within the band of around 400 MHz. The signal at this frequency is taken from the collector of the transistor 125 then drives an output filter 126 where it is transmitted to the antenna 127 in the form of a signal of about 0.5 mW. The carrier signal at 400 MHz is frequency modulated by two Schmitt triggers 128, 129 so assembled as to create a modulation signal of one KHz every 0.5 second. The beacon 17 is fed with the voltage (12 V) of the battery 114 of the vehicle and the emergency buffer battery 116 of 9 V in the case where the battery 12 V is disconnected. The current is supplied through the regulator 115 of the supply voltage at 5 V.

The beacon 25 is started up by means of two Schmitt triggers 133, 134 assembled as a flip-flop activated as soon as the beacon receives a negative pulse from an actuator. The actuator employed is in particular a mercury switch 135 which closes in the event of a raising of the vehicle, or a door opening switch or the like. The transmission of the beacon 25 is stopped by a simultaneous selection of the keys T1 and T2 of the remote control box, this selection being decoded through the diodes 136 and 137.

In an alternative embodiment of the beacon described hereinbefore, a radio receiving circuit is also provided and coupled to a signalization device of the vehicle, for example its parking lights. In this case, corresponding small transmitters employed by the law-enforcement forces will permit activating the parking lights of the stolen vehicle and thus facilitate its location.

It must be understood that the electronic antitheft device according to the invention is not intended to be limited to the detailed description of the embodiment and the functions performed by the invention could be performed by means of different circuits or components without departing from the scope defined by the invention. In particular, the described circuits, based on discrete components, could just as well be constructed by an integrated microcontroller grouping the essential part of the electronic functions, or by means of an ASIC, without departing from the described inventive concept. In particular, the use of a centre 5 employing a microcontroller (for example an ST62T10 of SGS-Thomson) permits programming once and for all the identification code of the device then definitively locking by a program the subsequent unauthorixed access to the stored code for pirating the device.

Further, according to another alternative embodiment of the device, the outputs of the control flip-flops driving the functional elements of the vehicle may be connected to aleatory terminal boxes (not shown). Thus, in two distinct units of the antitheft device according to the invention, the output flip-flops would control functional elements different from one vehicle to another. For example, the flip-flop controlling the general power supply on a first vehicle would be wired up on a second vehicle in such manner as to control the starter, which renders any apprenticeship of the connections for pirating purposes impossible.

According to another alternative embodiment of the electronic centre 5, the latter is equipped for providing on some of its control outputs a voltage lower than the conventional 12 V of the battery of the vehicle. Thus, the connection by a thief of the battery voltage to a functional element (starter, etc. . . . ) upstream of the centre would have for effect to burn out the centre or fuses and thereby immobilize the vehicle.

The antitheft device 1 just described operates and is employed in the following manner. Pressing a key T1 to T4 of the remote control box causes the continuous transmission of an infrared code comprising 28 identification code bits corresponding to a secret code stored once and for all in storage means of the fixed centre 5 of the antitheft device, and 4 actuating bits corresponding to the code of the particular key pressed. The mere release of the considered key stops the transmission of the infrared code. In this way, the remote control box 3 will only consume current in the transmitting stage, i.e. during short periods of time.

Pressing the key T1 causes the transmission to the electronic centre 5 of the secret code of 28 bits and of the code of the key T1, which permits opening the doors of the vehicle if the latter is provided with an electromechanical door opening device of known type. Once inside the driving compartment, the driver puts the box 3 in position in the receptacle 4. Pressing key T2 at that moment makes the general supply of the vehicle available, but pressing key T3 or T4 has no effect, since the magnetic switch 31 permits inhibiting the operation of the keys T3, T4 so long as the remote control box 3 is not positioned on its receptacle in the driving compartment of the vehicle. Consequently, it is impossible to start up the vehicle from outside the latter or by forcefully entering the compartment for shorting the electric conductors of the starter.

If the vehicle is equipped with a steering lock of the "Neyman" type, the driver actuates the contact key of the vehicle which has for effect to supply electricity to the centre 5. Note that in vehicles which are not provided with the "Neyman" lock, it is unnecessary to actuate the contact key which consequently becomes useless and may be eliminated. As soon as current is supplied to the centre 5, pressing of the keys T2, T3, T4 causes the actuation of the corresponding functional elements and in particular the actuation of the starter by the key T4. Note that from this moment, the box 3 may be withdrawn from its receptacle without effect on the operation of the vehicle, but it is better to leave the box in position so that if the engine stalls it is possible to immediately start up the engine by depressing key T4. In vehicles provided with a contact key and a "Neyman" lock, the withdrawal of the key disconnects the centre 5 and thenceforth the vehicle is not usable, even if the box 3 remains in position.

It will therefore be understood that the electronic antitheft device described hereinbefore attains its objective and provides many decisive advantages over known devices and a high adaptability to different types of vehicles and the extent of their equipment.

Only the use of the remote control box corresponding to the fixed centre 5 installed in the protected vehicle permits in succession opening the doors and hoods or lids of the vehicle (if the latter is provided with electric door opening devices, which is in no way indispensable to the operation of the other functional elements), then actuating, possibly in a predetermined sequence, the functional units of the vehicle. The multiplication of the functional units wired up on the antitheft device and their control by means of codes which are at least different in part (4 last bits on 32), permit increasing the difficulty of overcoming the device to an extent intolerable for most thieves.

Although the present invention has been described in connection with various preferred embodiments thereof, it will be appreciated that these embodiments are provided solely for purposes of illustration, and should not be construed as limiting the scope of the invention. Other embodiments and applications of the invention will be readily apparent to those skilled in the art from reading the present specification and practicing the techniques described herein, without departing whatsoever from the scope and spirit of the appended claims.

What is claimed is:

1. Electronic antitheft device for a motor vehicle having a plurality of conventional functional elements allowing a control of the operation of said vehicle, said device comprising:

a receptacle disposed in said driving compartment of said vehicle, a mobile remote control box comprising means for transmitting a digital code carried by a transmission beam, said remote control box comprising digital code transmitting means which transmit said digital code only when said remote control box is positioned in said receptacle;

an electronic centre comprising on an input side thereof means for receiving said digital code, said centre being connected on an output side of said center to at least one of said functional elements so as to control the operation thereof upon reception of said digital code.

2. Electronic antitheft device according to claim 1, wherein said beam is an infrared beam.

3. Electronic antitheft device according to claim 1, wherein said remote control box comprises an electric switch disposed in electric circuits of said remote control box, said receptacle comprising means for closing said electric switch upon the positioning of said remote control box in said receptacle so as to prevent the transmission of said digital code so long as said electric switch is open.

4. Electronic antitheft device according to claim 3, wherein said means for closing said electric switch comprise a magnetic device disposed in proximity to said receptacle and said electric switch is an electromagnetic switch which is closed under the effect of said magnetic device when said remote control box is positioned in said receptacle.

5. Electronic antitheft device according to claim 4, wherein said electromagnetic device is a permanent magnet.

6. Electronic antitheft device according to claim 1, wherein said remote control box comprises infrared transmitting means for transmitting said digital code by actuation of a plurality of keys disposed on said remote control box, each one of said plurality of keys causing actuation of one of said plurality of functional elements of said vehicle by transmission and decoding of said digital code when said remote control box is disposed in said receptacle.

7. Electronic antitheft device according to claim 1, wherein said remote control box is positioned in said receptacle in such manner that said transmitting means are in direct view of said receiving means.

8. Electronic antitheft device according to claim 1, comprising means for reflecting said beam transmitted by said remote control box, said reflecting means ensuring the reflection of said beam in a multitude of paths, and said receiving means being disposed at an intersection of any one of said paths for indirectly receiving said transmitted beam.

9. Electronic antitheft device according to claim 8, wherein said reflecting means comprise a cylindrical reflecting element disposed on said receptacle in direct view of said beam transmitted by said remote control box.

10. Electronic antitheft device according to claim 1, comprising means for transmitting said digital code upon actuation of any key of said box, said code comprising a first group of identification bits specific to a given electronic antitheft device, and a second group of actuating bits representing said particular keys actuated and corresponding to at least one particular functional element of said vehicle.

11. Electronic antitheft device according to claim 10, wherein said centre comprises circuit means for storing a predetermined sequence of actuation of said functional elements of said vehicle, means for comparing an order of actuation of said keys of said box with said predetermined sequence, and means for ensuring that said functional elements are actuated by said centre solely if the order of actuation of said keys corresponds to said predetermined sequence.

12. Electronic antitheft device according to claim 11, comprising means whereby the other keys cause actuation of selected ones of electronic circuits comprising electronic circuits controlling a release of the brakes of said vehicle, circuits controlling a shut-down of a general electrical circuit of said vehicle, circuits controlling said starter of said vehicle, and circuits controlling the opening of an electric fuel valve.

13. Electronic antitheft device according to claim 1, wherein said electronic center comprises a circuit for receiving and amplifying said beam, said circuit being connected to circuits for decoding said code transmitted by said remote control box;

a circuit for storing an identification code specific to said antitheft device;

comparison means connected to said decoding circuit and to said storage circuit for comparing said specific identification code with said code recorded in said storage circuit and only allowing the sequence of subsequent control operations of said electronic antitheft device when a comparison reveals a match between said recorded code and said specific identification code;

flipflop circuits generating actuating control signals when said comparison is positive, said actuating control signals being transmitted to said corresponding functional elements of said vehicle through the medium of electric relays disposed in said supply circuits of said functional elements.

14. Electronic antitheft device according to claim 13, comprising means for transmitting said digital code upon actuation of any one of said plurality of keys of said remote control box, said code comprising a first group of identification bits specific to a given electronic antitheft device, and a second group of actuating bits representing said keys actuated and corresponding to at least one of said plurality of functional elements of said vehicle, said circuit means for storing said code comprising first logic circuits having shift registers disposed in a ring arrangement, and said decoding circuits comprising second logic circuits having shift registers for decoding said actuating bits of said functional elements, the decoding of said identification bits only being authorized if a correct code has been decoded.

15. Electronic antitheft device according to claim 1, further comprising:

a radio beacon placed in said vehicle and provided with means for causing transmission of signals from said beacon in the event of a forced intrusion into said vehicle means placed in said remote control box for neutralizing an operation of said radio beacon when transmitting a control signal for opening said doors.

16. Electronic antitheft device according to claim 15, wherein said neutralizing means comprise a mercury switch.

17. Electronic antitheft device according to claim 15, wherein said beacon further comprises radio receiving circuits, the signal employing a carrier wave whose frequency is within a frequency range used by law-enforcement forces so as to facilitate localization and retrieval of said vehicle by said forces in the event that said vehicle is stolen.

* * * * *